United States Patent [19]
Atkinson

[11] Patent Number: 6,108,127
[45] Date of Patent: Aug. 22, 2000

[54] HIGH RESOLUTION CONFOCAL MICROSCOPE

[75] Inventor: Matthew R. C. Atkinson, Cottage Grove, Minn.

[73] Assignee: 3M Innovative Properties Company, Saint Paul, Minn.

[21] Appl. No.: 08/857,127

[22] Filed: May 15, 1997

[51] Int. Cl.[7] .......................... G02B 21/06; G02B 21/00
[52] U.S. Cl. .................... 359/389; 359/368; 359/385
[58] Field of Search .................... 359/227, 641, 359/368–369, 385–390; 356/72, 318, 326, 417, 376; 250/201.3, 216, 234

[56] References Cited

U.S. PATENT DOCUMENTS

| | | | |
|---|---|---|---|
| 5,032,720 | 7/1991 | White | 250/236 |
| 5,153,428 | 10/1992 | Ellis | 250/234 |
| 5,192,980 | 3/1993 | Dixon | 356/326 |
| 5,296,700 | 3/1994 | Kumagai | 250/216 |
| 5,428,475 | 6/1995 | Tanaami et al. | 359/368 |
| 5,532,873 | 7/1996 | Dixon | 359/385 |
| 5,579,157 | 11/1996 | Tanaami et al. | 359/368 |
| 5,633,751 | 5/1997 | Tanaami et al. | 359/368 |

FOREIGN PATENT DOCUMENTS

| | | | |
|---|---|---|---|
| 300571 | 1/1989 | European Pat. Off. | 359/368 |
| 539 691 A2 | 5/1993 | European Pat. Off. | |
| 727 684 A2 | 8/1996 | European Pat. Off. | |
| 4-336445 | 11/1992 | Japan | 359/368 |
| 2184321 | 6/1987 | United Kingdom | |

OTHER PUBLICATIONS

"Confocal Microscopy Applied to Metrology of Integrated Circuits," Matthew R.C. Atkinson, Ph.D. Thesis, *Dissertation Abstracts International*, 53/06–B, p. 2947, 1991.

*Primary Examiner*—Thong Nguyen
*Attorney, Agent, or Firm*—Melanie Gover

[57] ABSTRACT

A confocal scanning microscope includes a light source which provides a light beam and scanning optics which sweep the light beam across the surface of a sample. Light from the surface or interior of the sample passes through a pinhole lens which focuses the light on a pinhole for detection by an optical detector. An image of the surface may be scanned using the optical detector. An optical element is inserted in a detection arm of the confocal microscope. The optical element provides angular magnification and natural divergence to the beam from the surface of the sample.

11 Claims, 14 Drawing Sheets

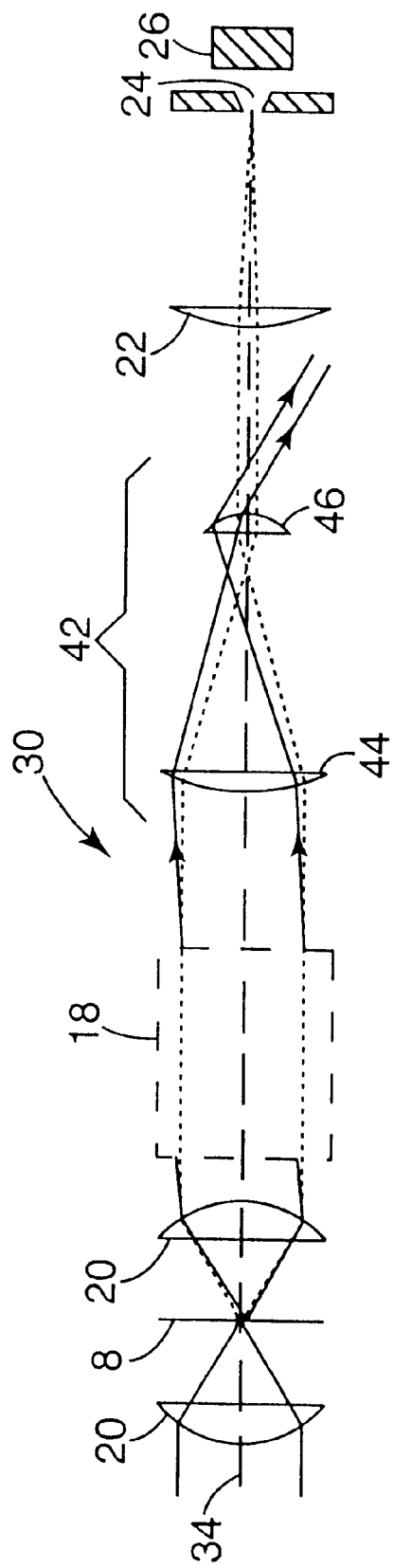

HIGH RESOLUTION CONFOCAL MICROSCOPE

BACKGROUND OF THE INVENTION

The present invention relates to optical microscopes. More specifically, the invention relates to confocal scanning optical microscopes.

Confocal scanning optical microscopes are known in the art and offer a number of advantages over traditional optical microscopes. One main advantage of a confocal scanning microscope is that it provides optical sectioning of a sample because it attenuates light which is not in focus. Thus, only light which is in focus contributes to the final image.

In a scanning confocal microscope, a beam is swept across a surface of a sample. The light which emanates from the sample (e.g., reflected from, emitted from or transmitted through) is directed towards a pinhole. Light that is in focus passes through the pinhole and onto an optical detector. As the beam is scanned across the surface of the sample, the output from the optical detector can be accumulated and formed into an image of the scanned surface.

SUMMARY OF THE INVENTION

The present invention includes a confocal scanning microscope. The microscope includes a light source providing a light beam and scanning optics which sweep the light beam across a surface of a sample. Light emanating (i.e., reflected from, emitted from or transmitted through) the surface passes through a pinhole lens which focuses the light on a pinhole for detection by an optical detector to thereby form an image of the object. An optical divergence element is inserted in the optical path and causes the light emanating from the sample to diverge and thereby cover an increased area of the pinhole lens.

BRIEF DESCRIPTION OF THE DRAWINGS

FIG. 5 is a simplified diagram of a detection arm of a confocal microscope including an optical element inserted in the detection arm in accordance with one aspect of the invention;

DETAILED DESCRIPTION OF THE PREFERRED EMBODIMENTS

The present invention provides a scanning confocal microscope. One aspect of the invention includes increasing resolution by more than a factor of three. The invention includes the placement of additional optical components in a return path of the microscope to increase rejection of off-axis light (i.e., light coming from a point away from where the probe beam is focused). This is done by increasing the angle between the beam and the optical axis and by increasing the natural divergence of the beam to better fill the pinhole lens to provide for a smaller focused spot at the plane of the pinhole.

Figure 1:
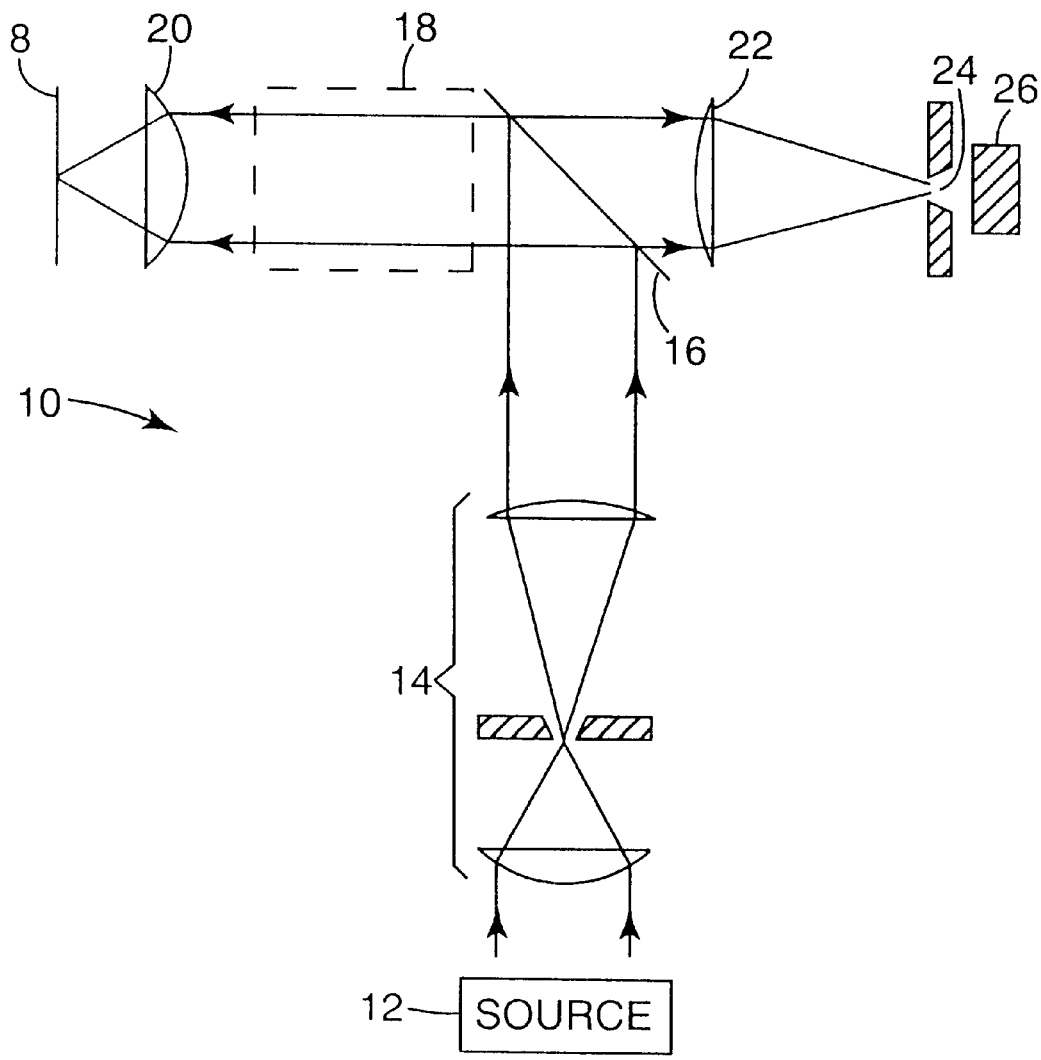
FIG. 1 is a simplified diagram of a prior art confocal microscope.
Figure 2:
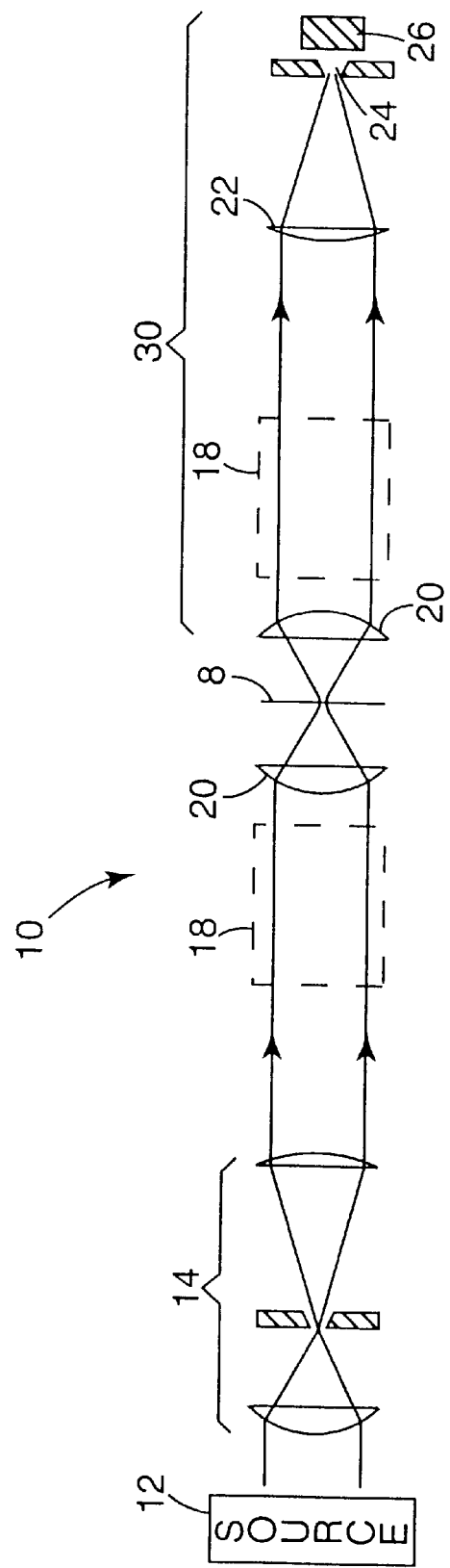
FIG. 2 is a "unfolded" diagram of the microscope of FIG. 1.

FIG. 1 is a simplified diagram of a prior art infinity-corrected confocal microscope 10 (or Type II microscope, after Wilson and Sheppard) focused on a sample 8. Such a microscope has a parallel beam path between a source 12, spatial filter 14, beam splitter 16, scanning optics 18 and objective lens 20. Scanning optics 18 and objective lens 20 focus light onto sample 8, one point at a time. The light emanating from sample 8 is collected and focused towards pinhole 24 according to known techniques. Light from an in-focus and on-axis point will be focused through the detection pinhole 24 and detected by detector 26. Light from points which are out-of-focus and/or off-axis will be focused away from pinhole 24 and not detected. FIG. 2 is an "unfolded" simplified diagram of microscope 10 and return path or arm 30 in which the present invention is employed. In subsequent figures, only the return path portion of the microscope is discussed.

The present invention relates to the portion of the beam path from objective 20 to the detector 26, i.e., return path or arm 30. To understand how microscope 10 detects the light, consider an on-axis point object, i.e., one which is in the center of the spot illumination on specimen 8. There is a decrease in the signal at detector 26 as the point object is moved off-axis. The variation of detected signals with point object offset is defined as the point-spread function (PSF). The narrower the PSF the higher the lateral resolution.

Figure 3:
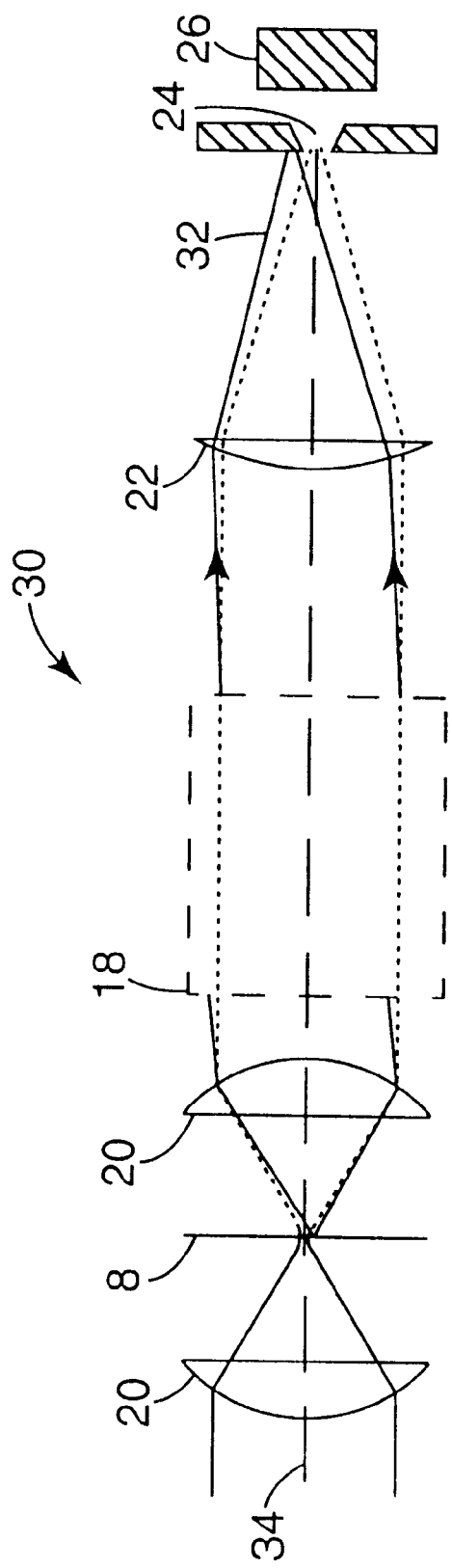
FIG. 3 is a simplified diagram of the detection arm of the confocal microscope of FIG. 1.
Figure 4:
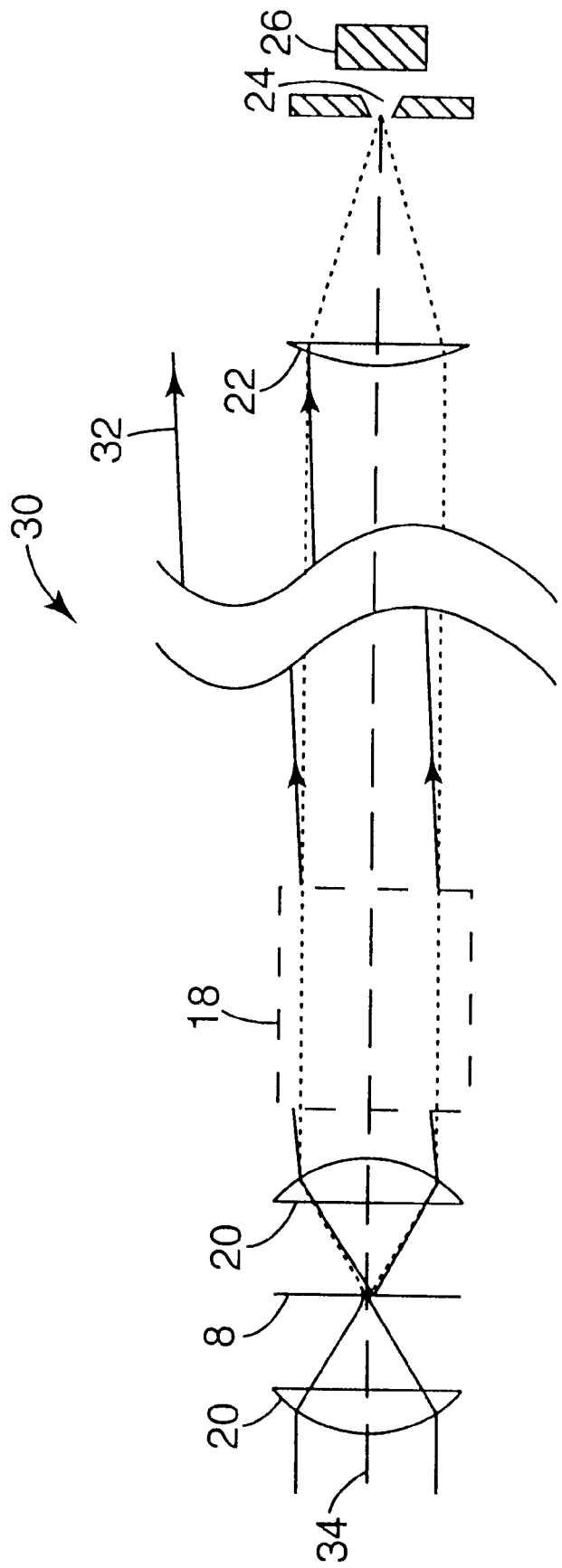
FIG. 4 is a simplified diagram of an elongated prior art detection arm of a confocal microscope.

FIG. 3 shows arm 30 and illustrates that the tilt of beam 32 away from optic axis 34 determines the shift of the spot on pinhole 24, and is directly related to the amount of offset of the point object from optic axis 34. Additionally, the tilt results in a small lateral shift in beam 32 on pinhole lens 22. However, in the prior art this has been ignored as negligible because typical microscopes use relatively short beam paths. In a microscope with a very long beam path (i.e., meters instead of centimeters), such effects cannot be ignored. As shown in FIG. 4, by greatly lengthening detection arm 30, beam 32 completely misses pinhole lens 22. This reduces the off-axis light which is detected, thus increasing the lateral resolution. The lateral response for this case has been derived:

"perhaps a system of lenses could be inserted into the detector arm that would increase the angle between the parallel beam and the optic axis. This would result in an even sharper lateral response." ("Confocal Microscopy Applied to Metrology of Integrated Circuits," Matthew R. C. Atkinson, Ph.D. Thesis, *Dissertation Abstracts International,* 53/06-B, p. 2947, 1991)

FIG. 5 is a simplified diagram of a return arm 30 in accordance with one aspect of the present invention. Note that in the figures similar elements have retained their numbering for simplicity. Return arm 30 includes optical element 42 which is inserted into the light beam path between scanning optics 18 and pinhole lens 22. In the embodiment shown in FIG. 5, optical element 42 is a simple Keplerian telescope having an objective lens 46 and a low-power lens 44. However, the invention includes other optical elements such as a simple Galilean telescope and more complex multi-lens elements.

Optical insert 42 acts as a telescope that magnifies the angle between the optic axis and light coming from an off-axis object. For a given object offset, the spot at the pinhole plane is further away from the optical axis than in FIG. 3 (Type II). However, upon examination of the device of FIG. 5, it can be determined that although the spot is further away from pinhole 24, because the beam is filling less of lens 22, the spot at the pinhole plane is larger by the same factor as the increase in distance from the optical axis, resulting in no net improvement in resolution.

Using the embodiments of FIG. 5, a model may be developed for the system considering natural divergence of the beam. In prior art confocal microscopes, natural divergence of the beam is not a factor because either the beam is wide enough that the effect is minimized (the angular spread of the beam being inversely proportional to the beam diameter at its narrowest point), the beam path is sufficiently short that it is not noticeable, or by operating in what is called a finite-conjugate or Type I configuration. However, in accordance with the invention, the beam leaving lenses 44,46 will be reduced in diameter such that divergence will be a factor. Not only is the beam angle to the optic axis magnified after passing through lenses 44,46 but the beam width is reduced. For large beam reduction ratios, the resulting beam width will be narrow enough that geometric optics propagation of the beam is not valid and physical optics must be used. The present invention includes a physical optics model which accounts for beam divergence. In the invention, there will be beam divergence θ when the beam reaches the pinhole lens 22, according to:

$$\theta = \frac{4\lambda}{\pi d_o} \qquad \text{Eq. 1}$$

wherein λ is the wavelength of light and $d_o$ is the initial beam width. This equation describes divergence of a Gaussian beam. Note that the divergence described by Equation 1 is changed slightly because the beam profile is different and there usually is a small bit of phase curvature to the field as it leaves the second insert lens 46. These will modify the divergence angle and thus the beam width at the pinhole lens.

Figure 5A:
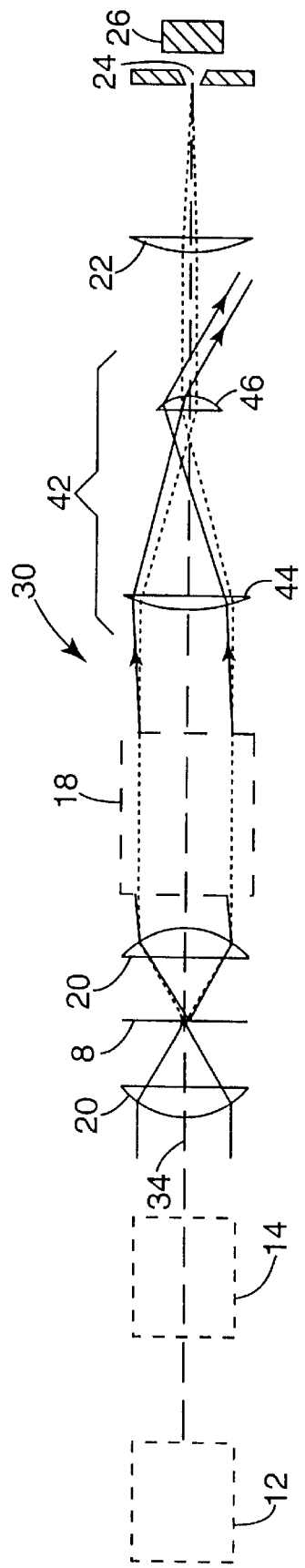
FIG. 5A is a simplified diagram showing the relationship between the light source and detection arm of a confocal microscope.

FIG. 5A shows a light source 12 and spatial filter 14 in relation to return arm 30. The light source may comprise a laser.

Figure 6A:
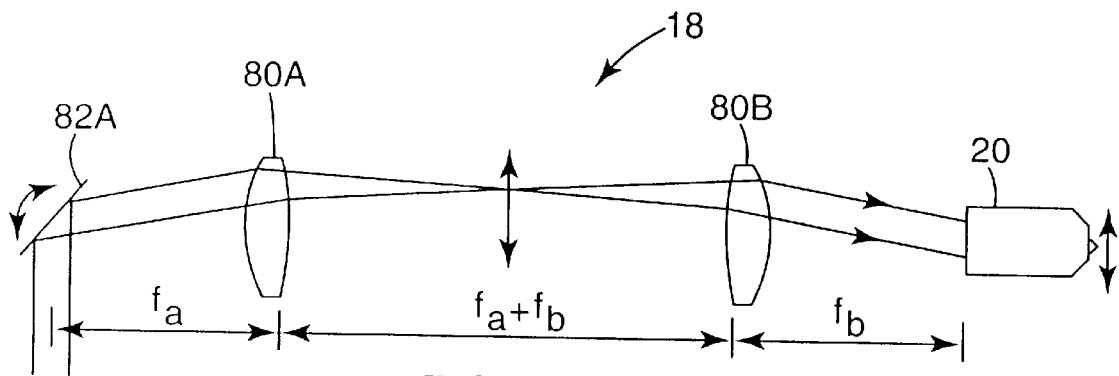
FIG. 6A is a side view of scanning optics in a confocal microscope.
Figure 6B:
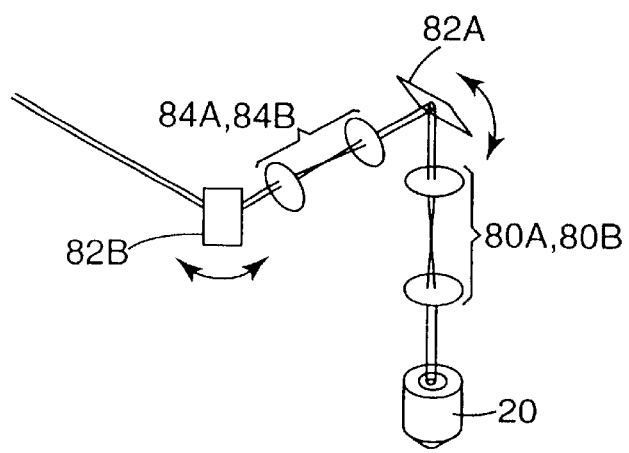
FIG. 6B is a perspective view of the scanning optics.
Figure 6C:
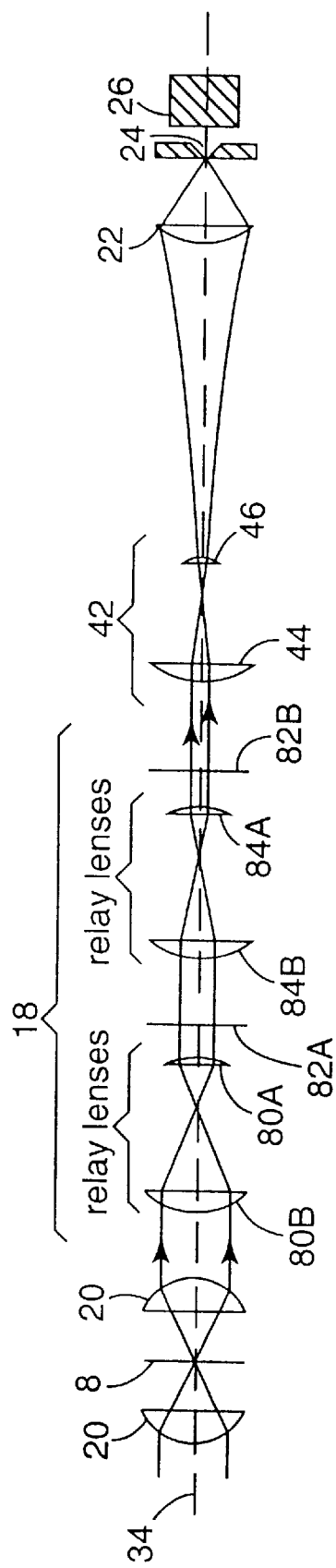
FIG. 6C is a simplified view of a confocal microscope having scanning optics in accordance with one aspect of the invention.

The present invention can be implemented anywhere in the return arm of a confocal microscope. For example, the invention may be implemented in scanning optics 18 which will now be explained in greater detail. FIG. 6A shows the positioning of relay lenses 80A and 80B in a typical embodiment of scanning optics 18. Lenses 80A,80B are positioned at the indicated distances relative to scanning mirror 82A, the objective lens 20, and each other. Scanning mirror 82A moves the beam as shown by the arrows in FIG. 6A. FIG. 6B shows an oblique view of a typical scanning system 18. There are two scanning mirrors 82A and 82B and two pairs of relay lenses 80A, 80B and 84A, 84B. Mirrors 82A, 82B each impart angular motion to the beam in orthogonal directions. FIG. 6C shows the unfolded beam path along the return path and shows scanning optics 18 in greater detail.

Figure 7:
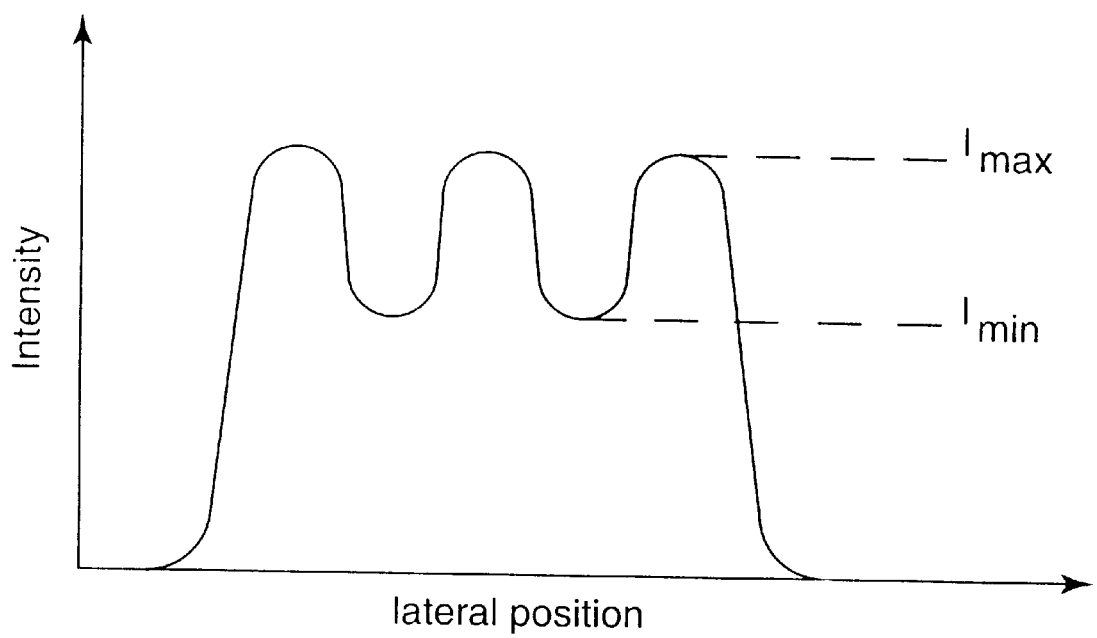
FIG. 7 is a graph of intensity versus lateral position for a resolution target scan with a confocal microscope.

Although the point-spread function (PSF) is usually calculated, it is not usually measured. Instead, a resolution target with groups of line pairs of different widths is imaged and the contrast is measured. FIG. 7 shows a schematic of a line profile across a portion of an image of a resolution target. One measure of the quality of the detection of an object is the contrast, which is calculated from FIG. 7 as:

$$\text{contrast} = (I_{MAX} - I_{MIN})/(I_{MAX} + I_{MIN}) \qquad \text{Eq. 2}$$

Figure 8:
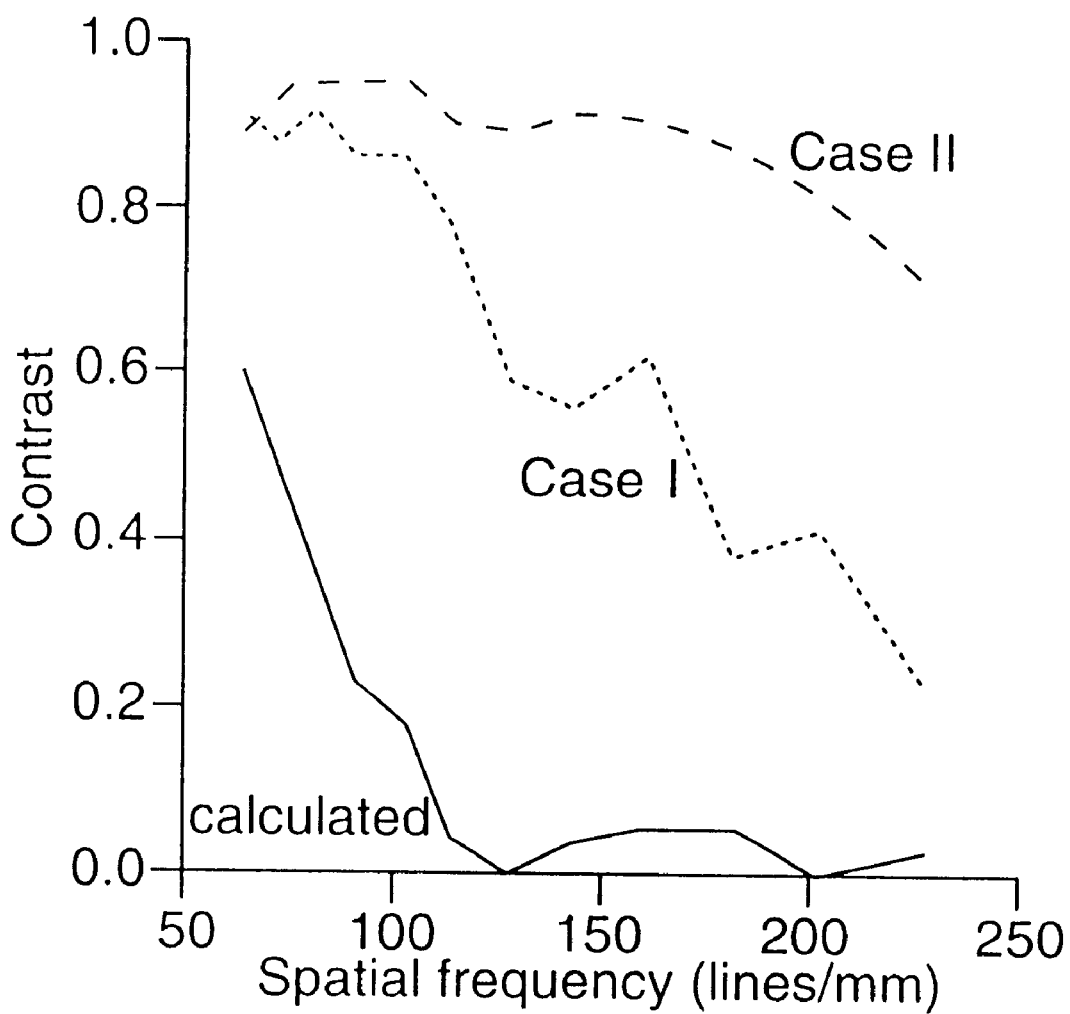
FIGS. 8 and 9 are graphs of contrast versus spacial frequency of confocal microscopes illustrating improvements provided by the present invention.
Figure 9:
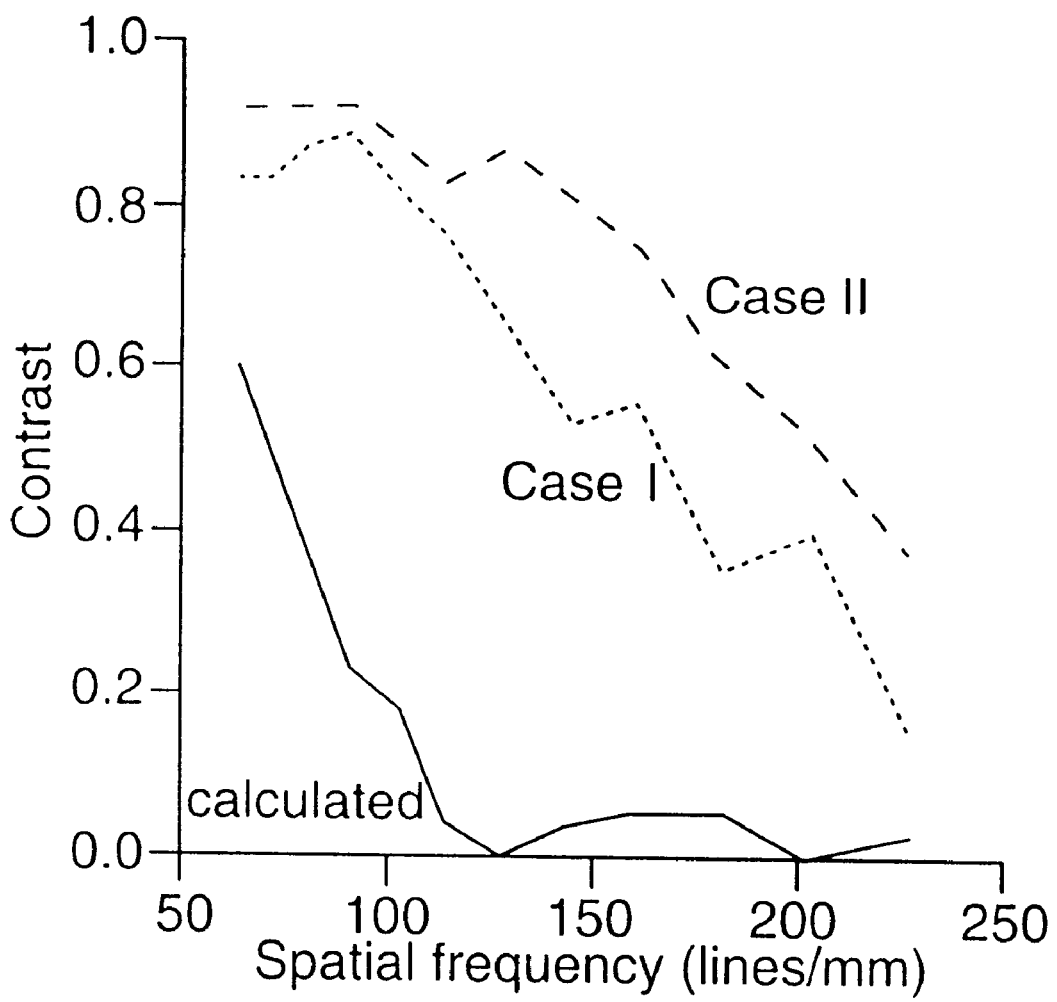

When two objects are just resolved according to the Rayleigh resolution criterion (the "standard" criterion), the contrast between them and the background is 0.19. In order to determine the resolution of a system, the contrast is measured as a function of the "spatial frequency" (given by the number of line-space pairs per unit distance) e.g., contrast=0.33 at 200 lines/mm. The Rayleigh resolution limit (or any other criterion) can be determined from these results. Contrast plots calculated from images obtained using device of FIG. 6C are shown in FIGS. 8 and 9. As expected, the calculated "conventional confocal" model (i.e., prior art) provides the lowest resolution. The case with the insert in both the scanning optics and the detection arm is best.

One aspect of the invention is the discovery that the natural divergence of the beam may be used advantageously to fill more of the pinhole lens 22 than in typical prior art systems. This results in a smaller focused spot in the pinhole plane. The desired optical divergence may be obtained by inserting or configuring appropriate optical elements anywhere in the optical path of return arm 30. One example is telescope 42 of FIG. 5. Another example is shown in FIG. 6C in which a 2:1 telescope is provided by lenses 80A,80B. Lenses 84A and 84B are also changed from a unit-magnification (1:1) element to a 2:1 telescope. This reduces the angular scan range at objective 20, which translates to a reduced scan area on object. Further, each telescope reduces the width of the reflected beam as it passes back through the scanning optics 18 on return path 40. When the return beam leaves the scanning optics, it has been reduced in width by a factor of 4. This beam is sufficiently narrow that it diverges in return path 40 and fills pinhole lens 22. Further, light returning from a spot which is away from the center of the focused spot leaves mirror 82B at an angle to the optic axis which is four times greater than with 1:1 relay optics of the prior art. The contrast plots for this case are shown in FIGS. 8 and 9 as Case I.

FIG. 6C also shows a further enhancement in that telescope 42 is also provided in return arm 40. Telescope 42 narrows the beam even further and thereby results in stronger divergence and better filling of pinhole lens 22, and thus a smaller focused spot at pinhole 24. Further, telescope 42 magnifies the angle between light returning from a spot which is away from the center of the focused spot and the optical axis 34. The contrast plots for this case are shown in FIGS. 8 and 9 as Case II. Case II provides additional further improvement in the resolution in comparison to Case I.

Figure 10:
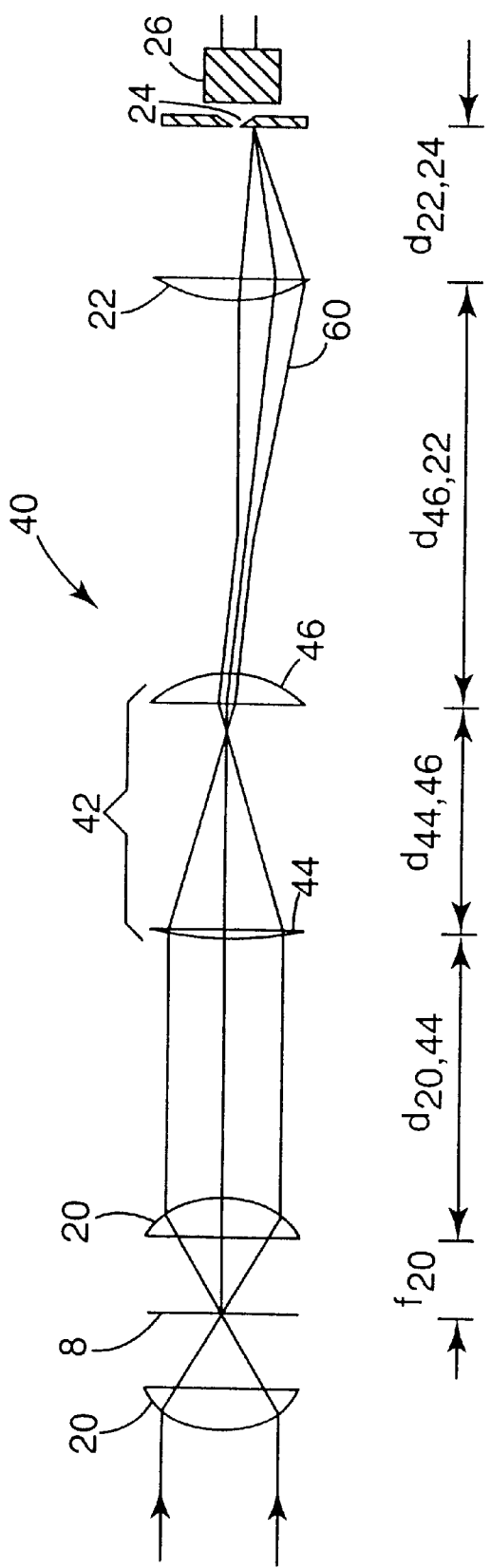
FIG. 10 is a simplified diagram showing divergence of the beam in the detection arm of a confocal microscope in accordance with one aspect of the present invention.

FIG. 10 is provided to describe operation of the invention and illustrates the effect of the natural divergence in the return arm 40. The divergence of the on-axis spot is shown by the lines at 60. As shown, the divergence causes the beam to fill a larger portion of pinhole lens 22 than in prior art systems. Element 42 also provides the aforementioned increased deflection of off-axis light. Preferably, the divergence should cause the beam to completely fill pinhole lens 22.

Operation of the present invention can be explained with reference to FIG. 10. As used herein: Ux, Ux' are the scalar fields before and after a lens (or object or pinhole) at position x, respectively. Light is a propagating electromagnetic (vector) field, but a standard approximation for system design is to use a scalar field. Further, fx, Px are the focal length and pupil size, respectively, of a lens at position x.

The angular spectrum of plane waves (ASPW) is an exact description of the propagation of a field over all distance ranges for all degrees of beam divergence. Different levels of approximation of the ASPW description yield the known Fresnel and Fraunhoffer diffraction integrals. In the present system, the shape of the light spot at pinhole 24 due to an on-axis point object can be calculated using the ASPW. For a well-corrected system, i.e., one with minimal aberrations within a certain field of view, the spot in the plane of pinhole 24 does not change shape as the point object is moved in the object plane. The position of the spot in the plane of pinhole 24 (as a function of the position of a point object in the object plane) can be predicted using standard geometric optics.

The pupil of objective lens 20 is sufficiently large that for all reasonable values of $d_{20,44}$, $U_{44}$ is effectively a plane wave. Upon passing through lenses 44 and 46 the beam is reduced in width by a factor $f_{44}/f_{46}$. If the beam is originally at an angle $\alpha$ to the optic axis (due to an off-axis point object in the object plane), it will now be at an angle $\beta = \alpha \times f_{44}/f_{46}$.

All light in free space will eventually tend to diverge. However, a narrower beam at some aperture will diverge at a greater rate. There are exact divergence equations for Gaussian beams (beams with a Gaussian profile), but not for truncated uniform plane waves. However, the same principle of divergence applies to both. The equation describing the divergence angle $\theta$ of a Gaussian beam is set forth above at Equation 1. In Equation 1, $d_o$ is the width of the beam where it leaves lens 46. Two things change the divergence from Equation 1 for the present case: the beam profile is different, and there usually is a small bit of phase curvature to the field as it leaves lens 46. These will modify the divergence angle and thus the beam width at pinhole lens 22.

$U'_{46}$ is sufficiently narrow that it diverges when propagating toward pinhole lens 22. One design goal is that the beam diverge sufficiently such that the width of $U_{22}$ is close to the width of $U'_{20}$. This can be done either by making $U'_{46}$ small (to increase the divergence angle) or by making $d_{46,22}$ large (to increase the available distance over which the beam can spread). $U'_{46}$ can be made small by having a large ratio $f_{44}/f_{46}$. Geometric optics predicts that the width of $U'_{46} = P_{20} \times f_{46}/f_{44}$. Diffraction calculations show that this is a reasonable approximation. However, to determine the actual shape of the focused spot at pinhole 24, diffraction calculations must be used throughout. Distance $d_{46,22}$ can be made large, but there are limits to how this can be done. Simple free space propagation from lens 46 to pinhole lens 22 is limited by the size of the instrument. Most commercial confocal microscopes are built as attachments on standard optical microscopes, and do not have room for the distances (on the order of a few meters) required. The beam can be folded into a more compact area by using mirrors. However, even the best mirrors introduce some wavefront distortion to the beam upon reflection (typically $\lambda/4$). These errors accumulate and lead to a larger spot at the pinhole 24. This degrades the resolution of the instrument.

Because of the divergence of $U_{22}$, the pinhole 24 must be shifted axially away from the nominal position of $d_{22,24} = f_{22}$ to get the best focus. Typically, this shift will be less than 10% of $f_{22}$. Diffraction calculations for an on-axis object are used to determine the best focus position and the shape of the spot in the plane of pinhole 24, i.e., $U_{24}$. Once the focus plane is found, the position of the spot (in the plane of pinhole 24) for an off-axis object can be calculated using geometric optics. Thus the lateral resolution can now be determined.

Geometric optics predicts that for some conditions and combinations of lenses and distances, the spot will not move on pinhole 24 when the object is moved. The beam will be focused to a spot, and the beam will tilt about pinhole 24, but will not move laterally. This will degrade the response dramatically (to the point of non-confocal lateral response). This position can be predicted and avoided.

Figure 11:
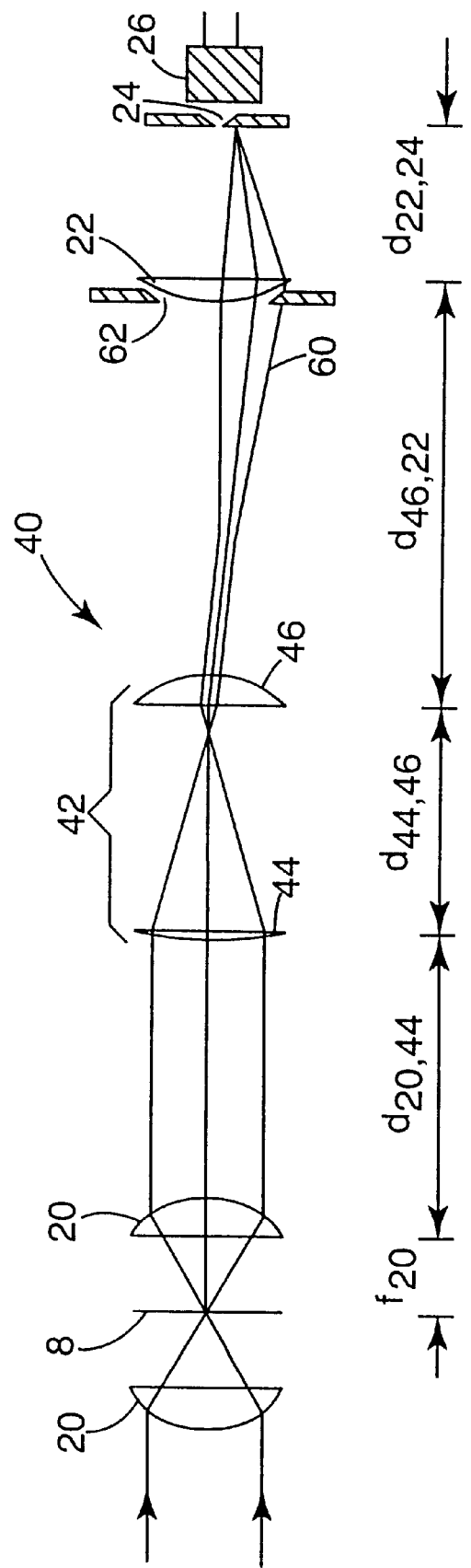
FIG. 11 is a simplified diagram of a confocal microscope including an aperture adjacent the pinhole lens and positioned between the pinhole lens and the optical divergence element in accordance with one aspect of the present invention.

FIG. 11 shows an alternate embodiment of the invention wherein an aperture is adjacent the pinhole lens and positioned between the pinhole lens and the optical divergence element.

Figure 12:
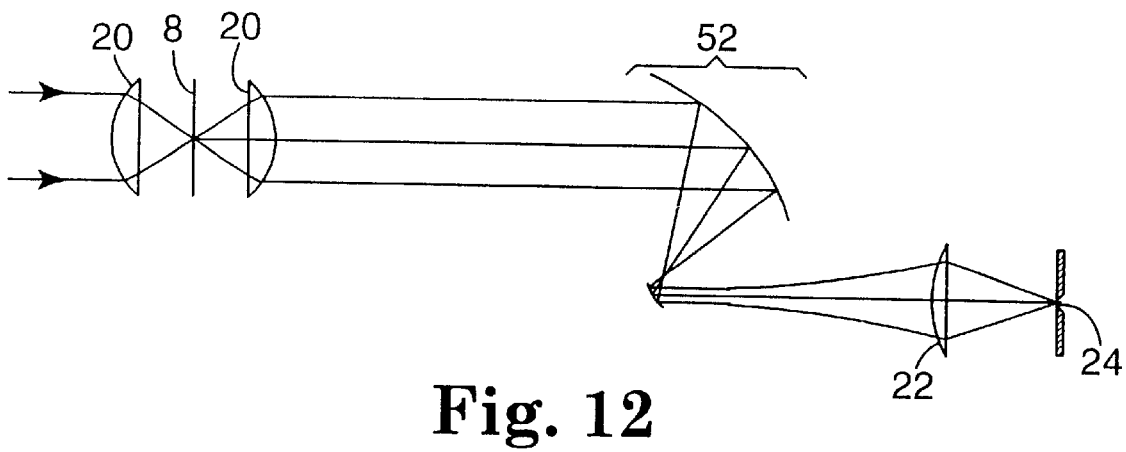
FIG. 12 is a simplified diagram of a confocal microscope showing an optical divergence element comprising two mirrors.

As described above, the present invention includes insertion of at least one magnifying element in the return path of a confocal microscope to increase deflection of off-axis light. Further, the optical element(s) of the insertion cause(s) the natural divergence of the beam to increase whereby a larger area of the pinhole lens is filled by the beam. The natural divergence refers to "physical optic" or "non-geometric" divergence of the beam in which the wavefront of the light diverges as the wavefront spreads out. Note that this is not the divergence which occurs with geometric optics which are not focused. Over a sufficiently long distance, the light beam will naturally diverge. However, using an optical element inserted in the return path, this divergence can be accelerated such that the overall beam path can be as short as one or less meters. One aspect of the invention includes a confocal microscope with desired natural divergence and a beam path of less than 3 meters. Further, any type of optical element may be inserted in the detection arm which provides this function and the invention is not limited to the telescope set forth in the preferred embodiment. For example, suitable mirrors, prisms or active elements can be used to promote divergence and/or magnification. FIG. 12 shows a confocal microscope in which optical divergence element 52 comprises two mirrors. Further, the microscope may be used as an ophthalmoscope in which the cornea plus lens of an eye of a patient acts as the objective lens for viewing the posterior of the eye. Alternatively, the microscope can be used in a system for retrieving optical data from a multilayer data medium of multiple layers of recorded optical data.

Although the present invention has been described with reference to preferred embodiments, workers skilled in the art will recognize that changes may be made in form and detail without departing from the spirit and scope of the invention.

What is claimed is:

1. A confocal scanning microscope for imaging an object, comprising:

a light source providing an illumination beam directed along an optical path having an optic axis toward the object;

an objective lens system in the optical path focusing the illumination beam to a spot on or in the object, whereby the object emits radiation from the spot thereby providing a beam emanating from the spot;

scanning optics between the light source and objective lens in the optical path to move the focused spot across a surface of the object;

a pinhole lens focusing the beam emanating from the spot toward a pinhole in the optical path;

the pinhole receiving at least a portion of the beam emanating from the spot;

a detector detecting the beam emanating from the spot, which beam passes through the pinhole; and at least one optical divergence element comprising at least two optical elements separated by a distance equal to the sum of their focal lengths in the optical path positioned between the pinhole lens and the objective lens to reduce the diameter of the beam emanating from the focused spot after the beam passes through the objective lens, at which point the beam is parallel, to an extent that natural optical divergence of the beam that has passed through the objective lens and the optical divergence element is accelerated.

2. The confocal scanning microscope of claim 1 wherein the optical divergence element comprises a telescope.

3. The confocal scanning microscope of claim 1 including an aperture adjacent the pinhole lens and positioned between the pinhole lens and the optical divergence element.

4. The confocal scanning microscope of claim 1 wherein the optical path is less than three meters in total length.

5. The confocal scanning microscope of claim 1 wherein the optical divergence element magnifies an off-axis angle of a portion of the beam that has passed through the objective lens from the focused spot, which beam portion originated from an off-axis point within the focused spot on the scanned object.

6. The confocal scanning microscope of claim 1 wherein the light source comprises a laser.

7. The confocal scanning microscope of claim 1 wherein the optical divergence element is part of the scanning optics.

8. The confocal scanning microscope of claim 7 wherein the optical divergence element comprises first and second telescopes in the scanning optics.

9. The confocal scanning microscope of claim 1 wherein the optical divergence element is positioned between the scanning optics and the pinhole lens.

10. The confocal scanning microscope of claim 1 wherein the optical divergence element includes a first divergence element in the scanning optics and a second divergence element between the scanning optics and the pinhole lens.

11. The confocal scanning microscope of claim 1 wherein the two components of the divergence element are any combination of components selected from the group consisting of lenses and mirrors.

* * * * *